United States Patent
Nakase

(10) Patent No.: US 8,553,288 B2
(45) Date of Patent: Oct. 8, 2013

(54) IMAGE FORMING APPARATUS CAPABLE OF PERFORMING ACCURATE GRADATION CORRECTION

(75) Inventor: Takahiro Nakase, Moriya (JP)

(73) Assignee: Canon Kabushiki Kaisha (JP)

( * ) Notice: Subject to any disclaimer, the term of this patent is extended or adjusted under 35 U.S.C. 154(b) by 123 days.

(21) Appl. No.: 13/154,935

(22) Filed: Jun. 7, 2011

(65) Prior Publication Data

US 2011/0304887 A1    Dec. 15, 2011

(30) Foreign Application Priority Data

Jun. 9, 2010 (JP) ................................ 2010-131927

(51) Int. Cl.
*H04N 1/40* (2006.01)
(52) U.S. Cl.
USPC .............. 358/3.24; 358/1.9; 358/504; 399/49
(58) Field of Classification Search
USPC .............................. 358/3.24, 1.9, 504; 399/49
See application file for complete search history.

(56) References Cited

U.S. PATENT DOCUMENTS

2003/0206308 A1* 11/2003 Matsuya .......................... 358/1.9

FOREIGN PATENT DOCUMENTS

| JP | 62-296669 A | 12/1987 |
| JP | 63-185279 A | 7/1988 |
| JP | 07-261479 A | 10/1995 |

* cited by examiner

*Primary Examiner* — Twyler Haskins
*Assistant Examiner* — Michael Burleson
(74) *Attorney, Agent, or Firm* — Rossi, Kimms & McDowell LLP

(57) ABSTRACT

An image forming apparatus capable of performing accurate gradation correction in a range of density where measurement by a toner density detection unit is-impossible. A printer unit forms a gradation pattern on an image bearing member. A density detection sensor detects density of the gradation pattern. A first correction value for correcting gradation of the image data is calculated based on density of the gradation pattern, detected by the density detection sensor, and a second correction value for correcting gradation of the image data is calculated based on the estimated condition of toner with which a toner image is formed on the image bearing member. An output gamma correction unit corrects density in a low density range of the toner image based on the first correction value, and corrects density in a high density range of the toner image based on the second correction value.

8 Claims, 16 Drawing Sheets

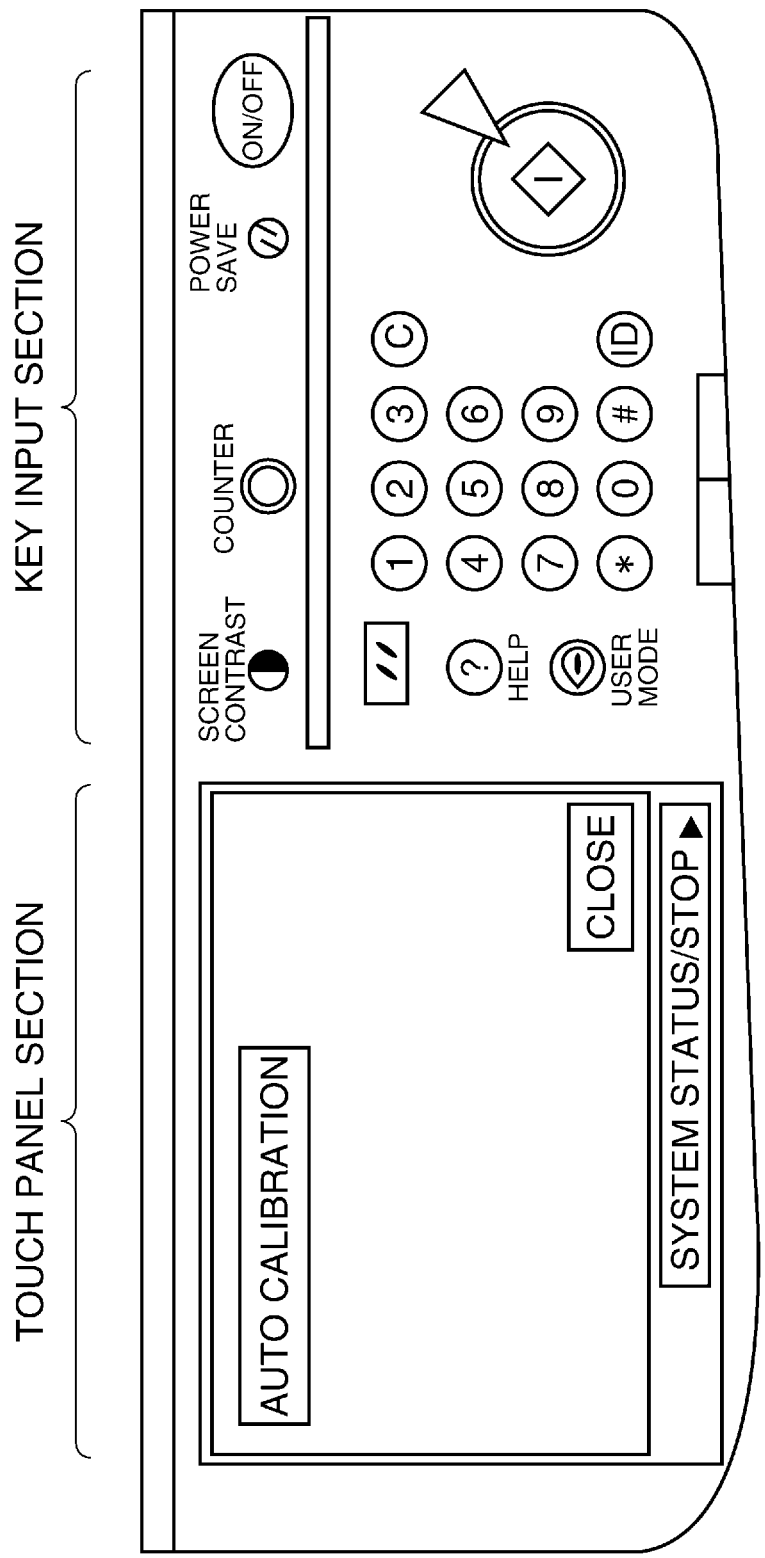

IMAGE FORMING APPARATUS CAPABLE OF PERFORMING ACCURATE GRADATION CORRECTION

BACKGROUND OF THE INVENTION

1. Field of the Invention

The present invention relates to an image forming apparatus such as a printer, a copying machine, or the like, that performs image formation e.g. by electrophotography.

2. Description of the Related Art

In printers, copying machines, and the like, that perform image formation e.g. by electrophotography, there has been known calibration for adjusting image quality to desired characteristics by reading an image pattern formed on a recording material and performing density correction and gradation correction. For example, in Japanese Patent Laid-Open Publication No. S62-296669 and Japanese Patent Laid-Open Publication No. S63-185279, as a method of calibrating an output image from an image forming apparatus, there has been proposed a technique of reading image information, such as density, chromaticity, etc. of a specific pattern formed on a recording material, and then feeding back the image information to image forming conditions, for improvement of image quality.

Further, in Japanese Patent Laid-Open Publication No. H07-261479, there has been proposed image calibration in which a latent image potential and a developing contrast potential are controlled by a charge bias voltage and a developing bias voltage in order to correct maximum image density, and a gradation correction table is changed in order to correct gradation characteristics.

In the above-mentioned Japanese Patent Laid-Open Publication No. S62-296669, Japanese Patent Laid-Open Publication No. S63-185279, and Japanese Patent Laid-Open Publication No. H07-261479, although gradation correction is performed using a pattern for gradation correction, which is formed on a recording material, this requires a user to place the recording material on which the pattern is formed on an original platen glass, and cause an image reader unit to read the pattern, which costs the user much time and labor. To eliminate this inconvenience, for example, there has also been proposed and realized a method of performing correction by optically detecting an amount of toner of a toner image formed on an image bearing member, such as a photosensitive member, an intermediate transfer member, or the like.

However, a detection unit which optically measures an amount of toner has a characteristic that if a surface of an image bearing member, such as a photosensitive member, an intermediate transfer member, or the like, is covered with a predetermined amount of toner, even when a larger amount of toner than the predetermined amount is adhered to the surface, a difference in the amount of toner is difficult to be detected. For example, "a" in FIG. 16A illustrates a state where the surface of the image bearing member is covered with a single layer of toner, with uncovered areas therein. "b" in FIG. 16A illustrates a state where the surface of the image bearing member is uniformly covered with a single layer of toner. "c" in FIG. 16A illustrates a state where the surface of the image bearing member is covered with two layers of toner.

FIG. 16B is a graph of an output from the optical detection unit with respect to an adhering toner amount, as obtained when toner on the surface of the image bearing member in the respective states of the above-mentioned "a", "b", and "c" is measured by the optical detection unit, in which the horizontal axis represents the adhering toner amount and the vertical axis represents the output from the optical detection unit.

According to the graph in FIG. 16B, although there is a large difference in the output between the states of "a" and "b", there is little difference in the output between the states of "b" and "c". For this reason, conventionally, in a higher density range than a range in which a difference in the output is generated (difference can be read), execution of gradation correction is limited to the range in which the difference can be approximated by a linear line or differences can be read. This causes a problem that in the gradation correction using the optical detection unit, the measurement in the high density range is low in accuracy or is impossible.

SUMMARY OF THE INVENTION

The present invention provides an image forming apparatus that is capable of performing accurate gradation correction in a range of density which cannot be measured by a toner density detection unit.

The present invention provides an image forming apparatus that forms a toner image on an image bearing member according to image data, comprising an image forming unit configured to form a gradation pattern on the image bearing member, a density detection unit configured to detect density of the gradation pattern formed by the image forming unit, a first calculation unit configured to calculate a first correction value for correcting gradation of the image data based on density of the gradation pattern, detected by the density detection unit, a second calculation unit configured to estimate a condition of toner with which the image forming unit forms a toner image on the image bearing member, and calculate a second correction value for correcting the gradation of the image data based on the estimated condition of toner, and a correction unit configured to correct density in a low density range of the toner image based on the first correction value, and correct density in a high density range of the toner image based on the second correction value.

According to the present invention, it is possible to perform accurate gradation correction in a range of density where measurement by the toner density detection unit is impossible.

Further features of the present invention will become apparent from the following description of exemplary embodiments with reference to the attached drawings.

BRIEF DESCRIPTION OF THE DRAWINGS

FIG. 12 is a diagram showing an example of a display of a console panel.

DETAILED DESCRIPTION OF THE EMBODIMENTS

The present invention will now be described in detail below with reference to the accompanying drawings showing embodiments thereof.

Figure 1:
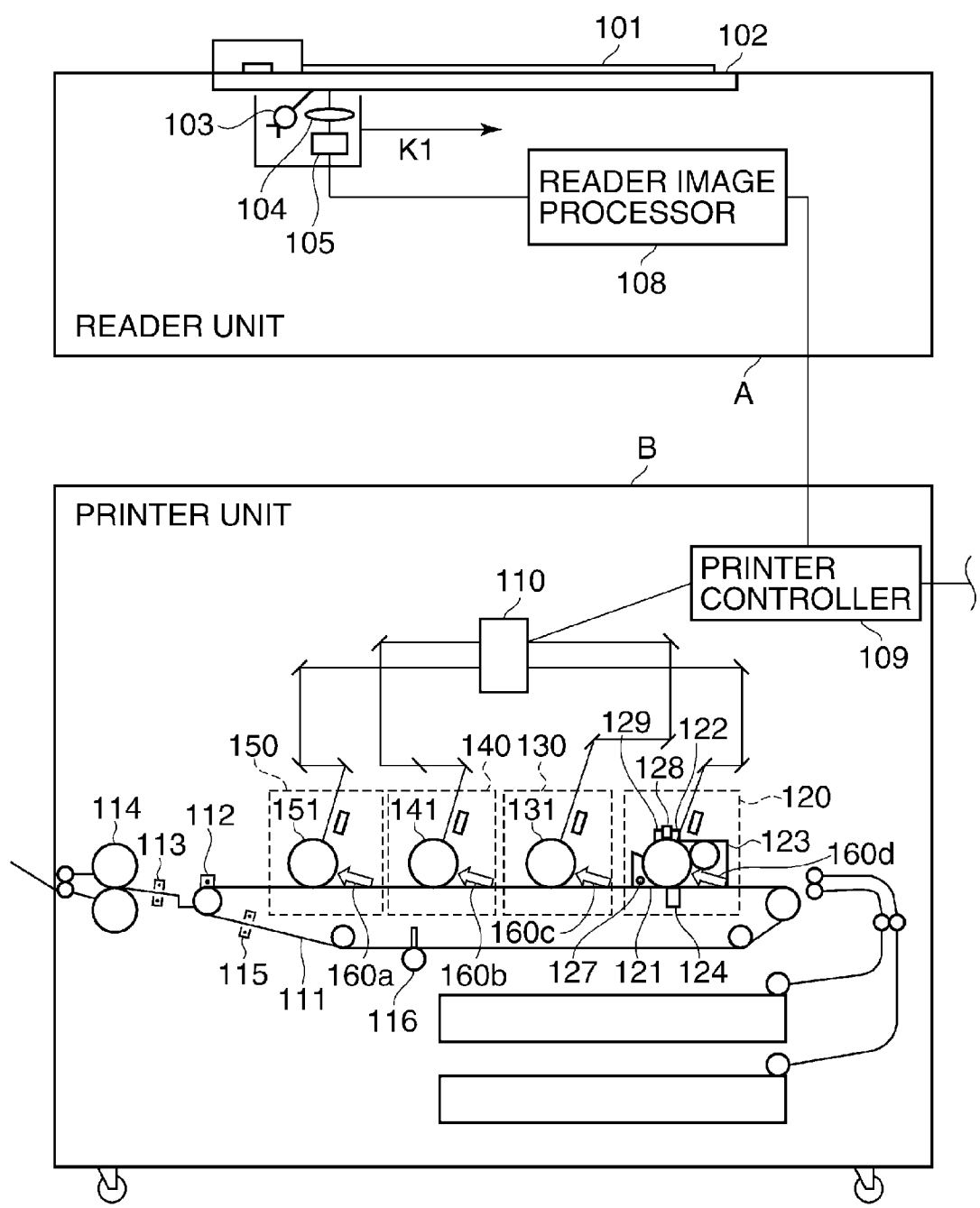
FIG. 1 illustrates an image forming apparatus according to a first embodiment of the present invention.

FIG. 1 is a diagram showing an image forming apparatus according to a first embodiment of the present invention.

In FIG. 1, the image forming apparatus according to the first embodiment of the present invention is implemented e.g. by an electrophotographic color copying machine including a plurality of photosensitive drums (photosensitive members), and comprises a reader unit A and a printer unit B.

First, the reader unit A will be described.

An original 101 placed on an original platen glass 102 is irradiated with light from a light source 103, and reflected light from the original passes through an optical system 104 to form an image on a CCD sensor 105. The reading unit constituted by the light source 103, the optical system 104, and the CCD senor 105 performs scanning in a direction indicated by an arrow k1 in FIG. 1 to whereby the original is converted to line-by-line electric signal data rows.

Image signals (image data) obtained by the CCD sensor 105 are subjected to image processing by a reader image processor 108, and then are delivered to the printer unit B, where a printer controller 109 performs predetermined image processing. Note that the printer controller 109 also performs image processing on image signals input from a print server or the like to the image forming apparatus via a telephone line, a network, or the like.

Next, the printer unit B will be described.

In the printer controller 109, the image signals input from the reader image processor 108 are converted to pulse-width modulated (PWM) laser beams, and then are output to a polygon scanner 110. The polygon scanner 110 irradiates each of the output laser beams onto an associated one of image bearing members of respective photosensitive drums 121, 131, 141, and 151 via a plurality of mirrors, thereby performing scanning in an axial direction of each photosensitive drum.

An yellow (Y) image forming unit 120, a magenta (M) image forming unit 130, a cyan (C) image forming unit 140, and a black (Bk) image forming unit 150 form images of the respective associated colors. The image forming units 120 to 150 are substantially identical in construction and operation. Therefore, in the following, the image forming unit 120 will be described in detail as a representative, and description of the other image forming units is omitted.

In the image forming unit 120, a laser beam from the polygon scanner 110 forms an electrostatic latent image on the surface of the photosensitive drum 121. A primary charger 122 charges the surface of the photosensitive drum 121 to a predetermined potential to make the same prepared for forming the electrostatic latent image. A developing device 123 develops the electrostatic latent image on the photosensitive drum 121 to thereby form a toner image. A transfer blade 124 performs electric discharge from the reverse surface of a transfer belt 111 to thereby transfer the toner image on the photosensitive drum 121 onto a recording material on the transfer belt 111.

After the toner image is transferred onto the transfer belt 111, the surface of the photosensitive drum 121 is cleaned by a cleaner 127 and has charge thereon eliminated by an auxiliary charger 128, and further, residual charge remaining on the photosensitive drum 121 is removed by a pre-exposure lamp 129 such that the primary charger 122 can properly charge the same again.

Further, the recording material having the toner (Y) image transferred thereon is conveyed by the transfer belt 111, and then toner images of the respective colors formed on the M, C, and Bk image forming units 120 to 150, respectively, are sequentially transferred onto the recording material, whereby a four-color image is formed on the surface of the recording material.

The recording material having passed the image forming unit 150 has its charge eliminated by a charge eliminator 112, and is then separated from the transfer belt 111. After the recording material is separated from the transfer belt 111, the transfer belt 111 has its charge eliminated by a transfer belt charge eliminator 115, and is then cleaned by a belt cleaner 116, whereby the transfer belt 111 gets prepared for attracting a recording material again. The separated recording material is charged by a pre-fixation charger 113 so as to supplement toner adhesiveness to thereby prevent occurrence of image disturbance, and then the toner image is fixed by a fixing device 114.

In the respective vicinities of the photosensitive drums 121, 131, 141, and 151, optical sensors 160a, 160b, 160c, and 160d are disposed at respective locations opposed to the photosensitive drums. Each of the optical sensors 160a to 160d is an example of a density detection unit which optically measures an adhering toner amount of a toner image formed on the photosensitive member.

Figure 2:
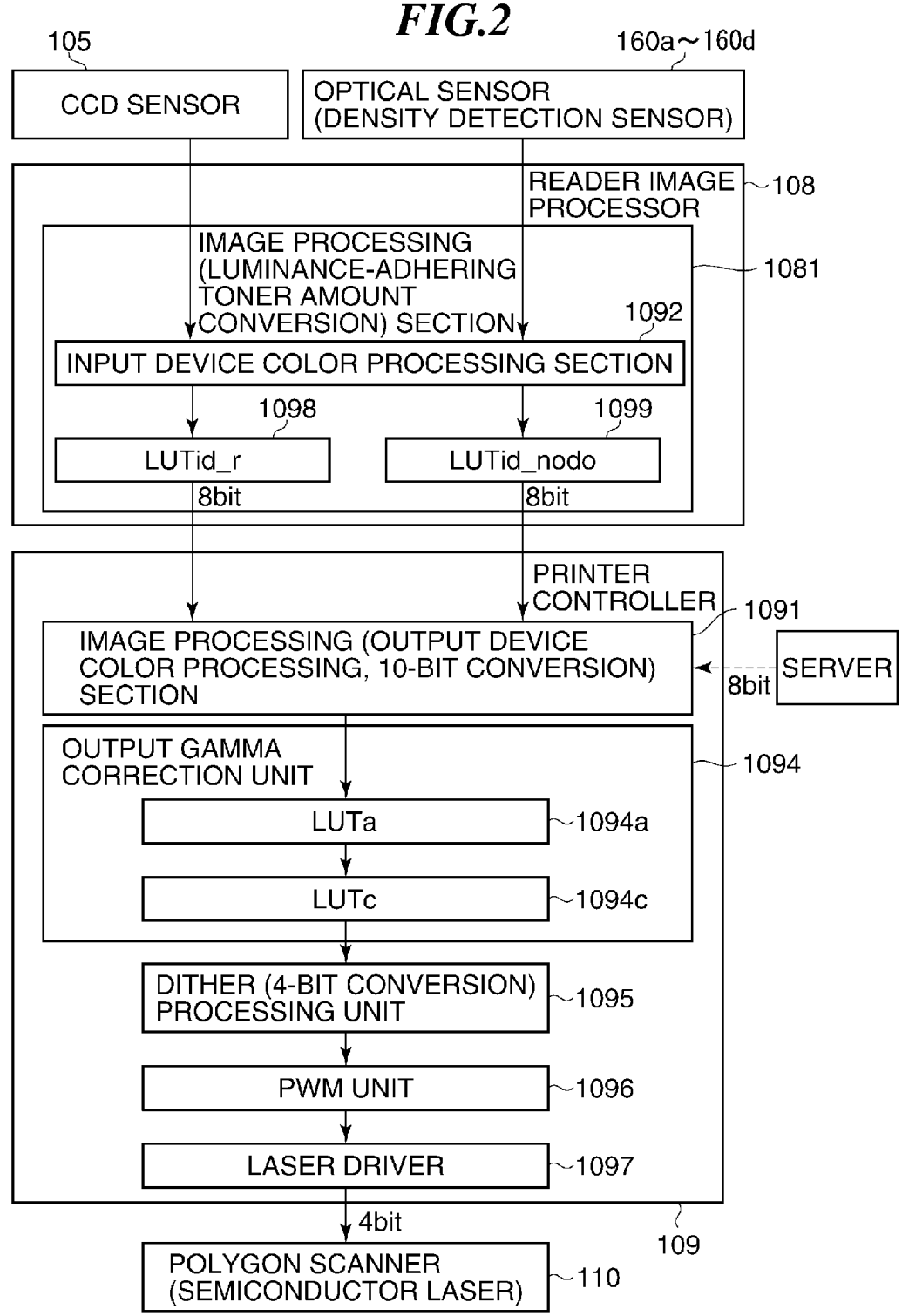
FIG. 2 is a schematic block diagram of a reader image processor and a printer controller, appearing in FIG. 1.

FIG. 2 is a schematic block diagram of the reader image processor 108 and the printer controller 109, appearing in FIG. 1.

When luminance signals obtained by reading the original using the CCD sensor 105 are input to the reader image processor 108, they are converted to density signals by an image processing (luminance-adhering toner amount conversion) section 1081. Further, also as to output signals from the optical sensors (hereinafter referred to as the "density detection sensors") 160a to 160d which are disposed at respective locations opposed to the photosensitive drums 121 to 151, when they are input to the reader image processor 108, they are converted to density signals by the image processing (luminance-adhering toner amount conversion) section 1081.

An input device color processing section 1092 retrieves luminance information (luminance signal) for each color of C, M, Y, and Bk from the luminance signals input from the CCD sensor 105 and the output signals input from the density detection sensors 160*a* to 160*d*.

A look-up table (LUTid_r) 1098 is a conversion table for calculating density associated with each of the luminance signals input from the CCD sensor 105, and converts the luminance signals transferred from the input device color processing section 1092 to density signal values. A look-up table (LUTid_nodo) 1099 is a conversion table for calculating density associated with each of the signals input from the density detection sensors 160*a* to 160*d*, and converts the output signals from the density detection sensor 160*a* to 160*d* to density signal values.

In the printer controller 109, an image processing (output device color processing, 10-bit conversion) section 1091 is an output direct mapping section, and calculates an amount of blend of C, M, Y, and Bk from an associated table such that the image forming apparatus outputs an image in correct colors with respect to the input image signals. Note that when image signals are input from a print server or the like to the printer controller 109, the image processing section 1091 and an output gamma correction unit 1094 perform image processing and color processing adapted to output characteristics, respectively, on the image signals, such that a desired output is obtained by ideal image processing with ideal printer output characteristics.

Although the maximum number of gradations of an input signal to the image processing section 1091 (output direct mapping section) is limited to a number corresponding to 8 bits, the number of the gradations is extended to a number corresponding to 10 bits in the image processing section 1091, and the signal continues to be subjected to 10-bit processing up to dither processing performed by a dither processing unit 1095, referred to hereinafter.

The output gamma correction unit 1094 includes a look-up table (LUTa) 1094*a* and a look-up table (LUTc) 1094*c*, and performs correction so as to ensure both proper gradation characteristics and printer operation at the same time, thereby adjusting the printer unit B to ideal characteristics. The LUTa 1094*a* and the LUTc 1094*c* are 10-bit conversion tables (density correction characteristics) which are generated by image control (calibration), described in detail hereinafter, and is used to change the gamma characteristics of the printer output.

The signals output from the output gamma correction unit 1094 are subjected to dithering by the dither processing (4-bit conversion) unit 1095 and are then sequentially delivered to a PWM unit 1096. The dither processing unit 1095 performs halftone processing for converting each 10-bit image signal to 4-bit data. Further, the dither processing unit 1095 has a plurality of dither processing circuits so as to change resolution according to attributes of the image signal.

The PWM unit 1096 performs PWM control according to the 4-bit data obtained by dithering at the dither processing unit 1095, and sends an instruction to a laser driver 1097. The laser driver 1097 outputs a semiconductor laser beam in a set amount of light to the polygon scanner 110 in response to the instruction from the PWM unit 1096.

Hereafter, a description will be given of control of the image forming conditions, as a characterizing feature of the present invention.

The present invention is characterized in that gradation control (calibration) is accurately performed in the whole density range. In the present embodiment, first and second calibrations will be described with reference to FIG. 3.

Figure 3:
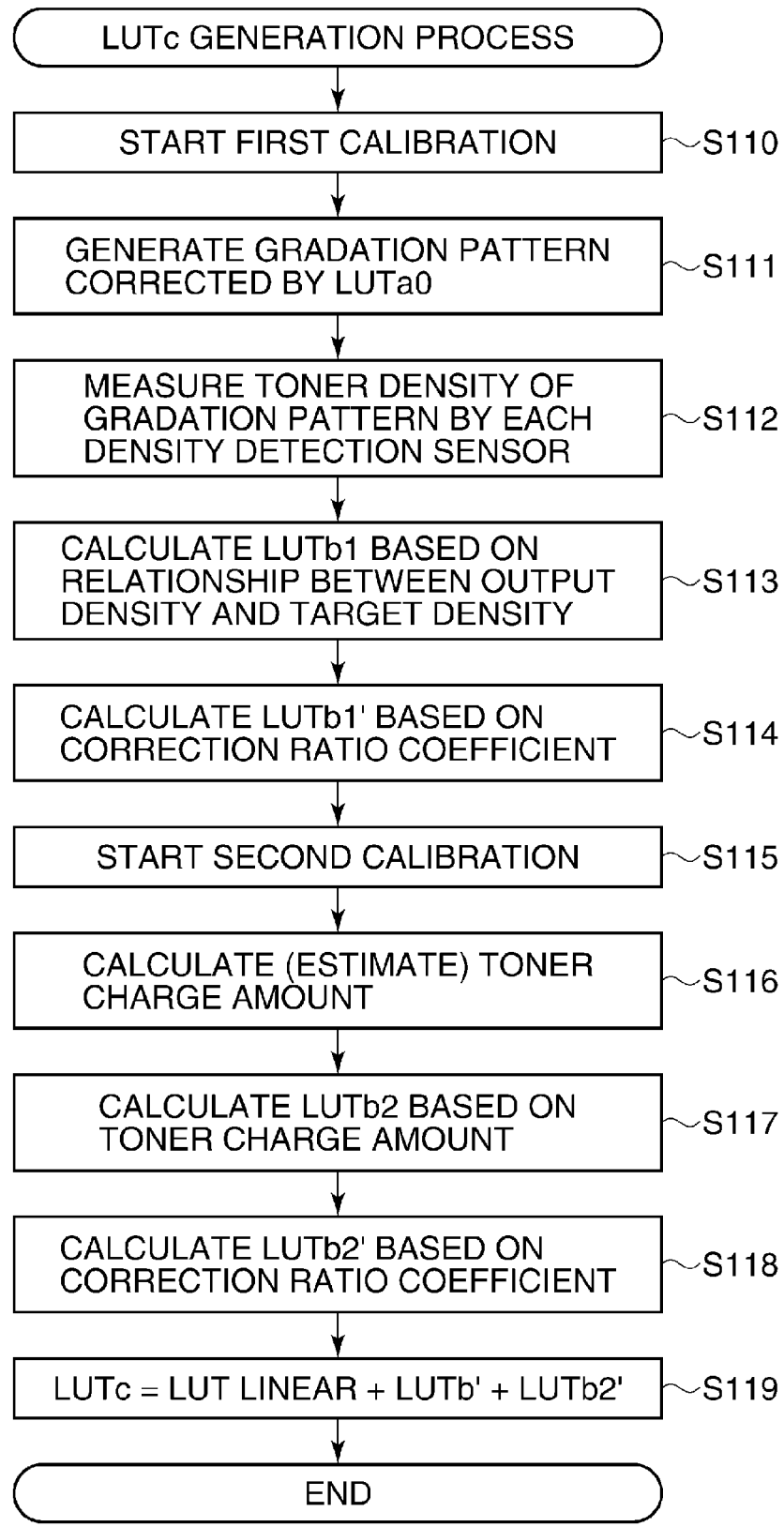
FIG. 3 is a flowchart of a calibration process in the first embodiment.

FIG. 3 is a flowchart of a calibration process in the first embodiment.

Figure 4:
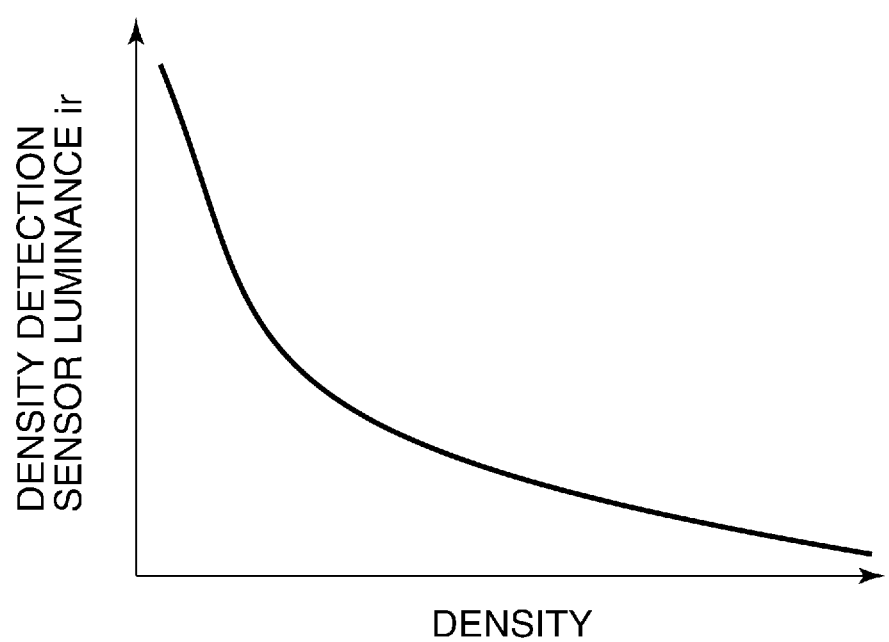
FIG. 4 illustrates an example of a conversion table used in the calibration process in FIG. 3.

The first calibration (first correction) in steps S110 to S114 in FIG. 3 is calibration using the density detection sensors 160*a* to 160*d*. That is, density on a sheet is calculated by passing the output signals from the density detection sensors 160*a* to 160*d* through the conversion table (LUTid_nodo) 1099, as shown in FIG. 4, in which the vertical axis represents density detection sensor luminance ir, and the horizontal axis represents density on the sheet. In advance, the gradation pattern corrected by the LUTa such that the gradation characteristics coincide with a target density is formed on the photosensitive drum, and the toner densities read by the density detection sensors 160*a* to 160*d* are stored in a memory (not shown). The stored density data is the target density. The LUTa at this time is defined as a look-up table (LUTa0), and is represented by Target in FIG. 5A.

Figure 5A:
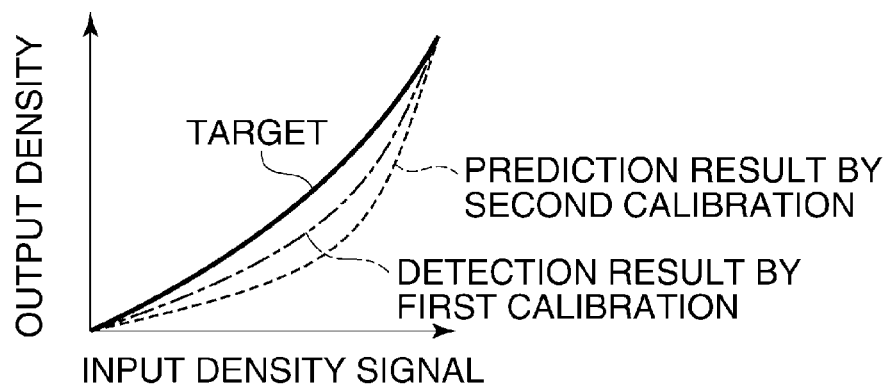
FIGS. 5A to 5C illustrate a relationship between input density and output density in the calibration process in FIG. 3.

In a graph shown in FIG. 5A, the horizontal axis represents values of a density signal input to the image forming apparatus, and the vertical axis represents density which output from the image forming apparatus.

Figure 6A:
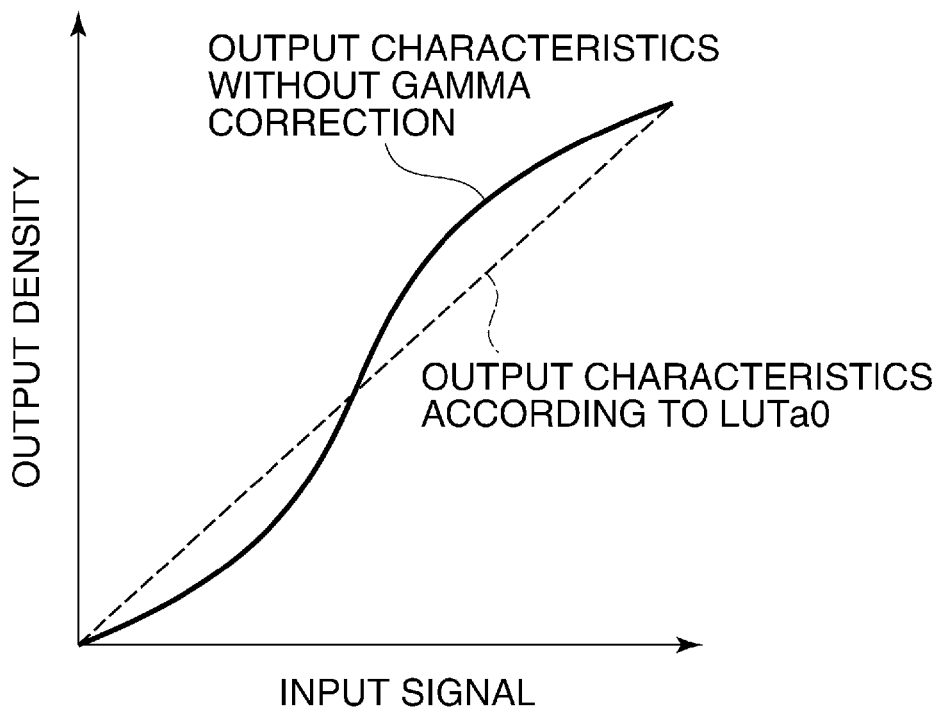
FIGS. 6A and 6B illustrate an example of a gamma correction table used in the calibration process in FIG. 3.
Figure 6B:
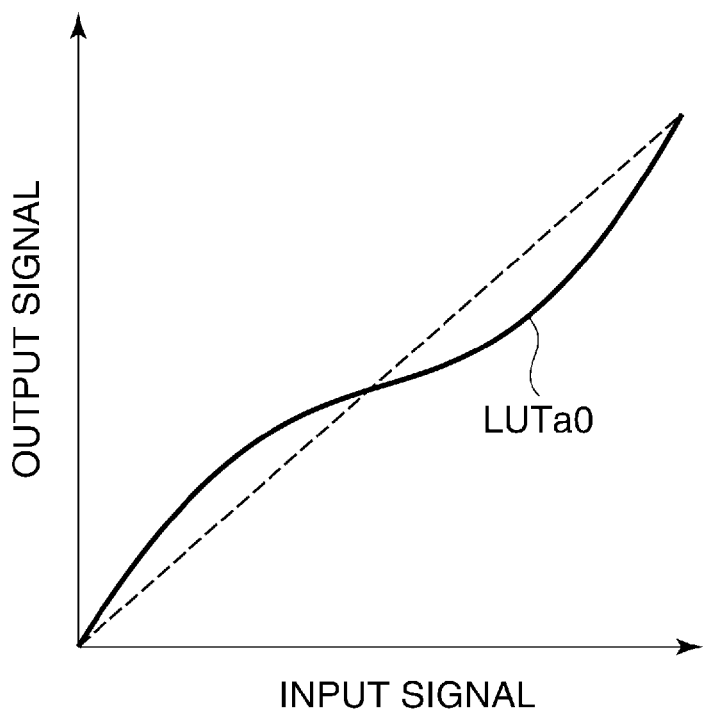

When the image forming apparatus is in a center state, if the output is performed without the output gamma correction, the output shows a characteristic indicated by a solid line in FIG. 6A. Inversion of this gives the LUTa0 indicated by a solid line in FIG. 6B. Note that the center state of the image forming apparatus is intended to mean a state in which all items related to image creation conditions of the image forming apparatus are in the center of variation. For example, it means a state in which variation in the amount of toner (developer) is in the center, a deviation of high voltage of the charger with respect to the setting is 0, and the distance between the developing device and the photosensitive member is a center value in the design range.

By outputting the density signals input to the image forming apparatus via the LUTa0, it is possible to reproduce an image at a targeted density indicated by a broken line in FIG. 6A. Note that the density signals input to the image forming apparatus are signal values which have been input from the CCD sensor 105 or the density detection sensors 160*a* to 160*d*, and have passed up to the image processing section 1091. The signal values are converted by referring to the LUTa0, and are subjected to dither processing, PWM processing, and processing by the laser driver to thereby perform image formation.

Referring again to FIG. 3, when instructed by the user or the number of printed sheets reaches a predetermined value, the first calibration is started (step S110). The image forming apparatus forms a gradation pattern corrected by the LUTa0 on each photosensitive drum (step S111), and the density detection sensors 160*a* to 160*d* each measure the toner density on an associated one of the photosensitive drums (step S112).

Figure 5B:
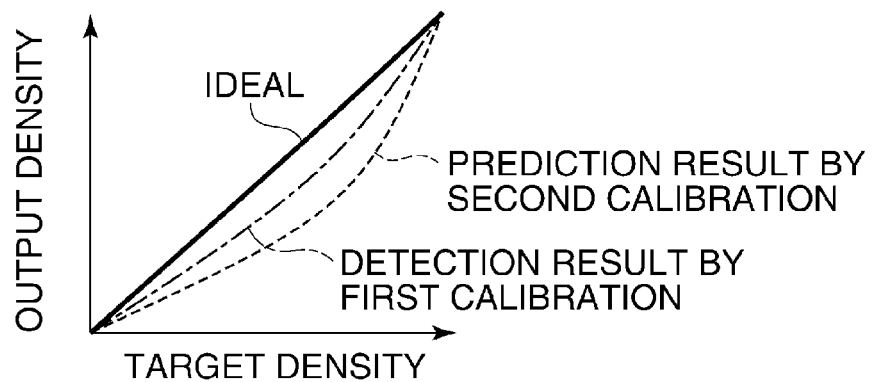
Figure 5C:
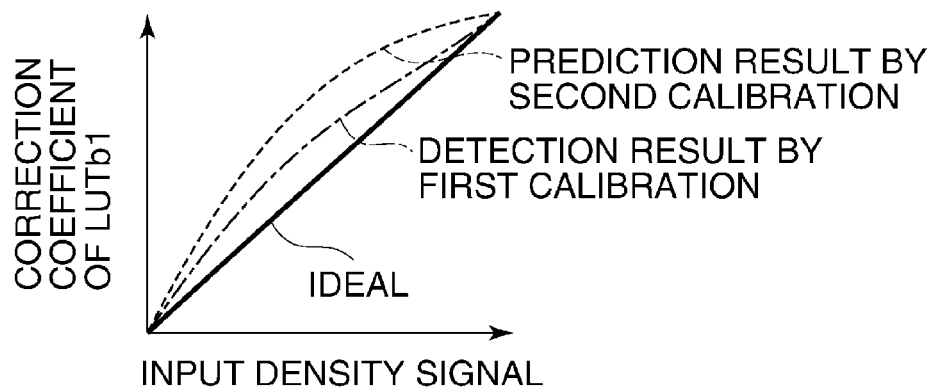

Next, the output gamma correction unit 1094 plots a value of the read density with respect to each value of an input density signal (see FIG. 5A). Next, the output gamma correction unit 1094 plots a value of the read density in association with a value of the target density corresponding to each value of the input density signal (see FIG. 5B). Next, an inverse of a ratio of each value of the output density to an associated value of the target density is calculated to thereby calculate i.e. define a correction coefficient look-up table (LUTb1) in which the inverse of the ratio, i.e. a value of a correction coefficient for converting the output density to the target density, is associated with each value of the input density signal (step S113, see FIG. 5C).

Next, the output gamma correction unit 1094 calculates a difference between the correction coefficient of the output correction table LUTb1 and 1 for each value of the input density signal. Then, the output gamma correction unit 1094 calculates i.e. defines a correction coefficient adjustment table LUTb1' in which an adjustment correction coefficient obtained by multiplying the above difference by an associated value of a correction ratio coefficient, referred to hereinafter, is associated with each value of the input density signal (step S114).

Figure 7:
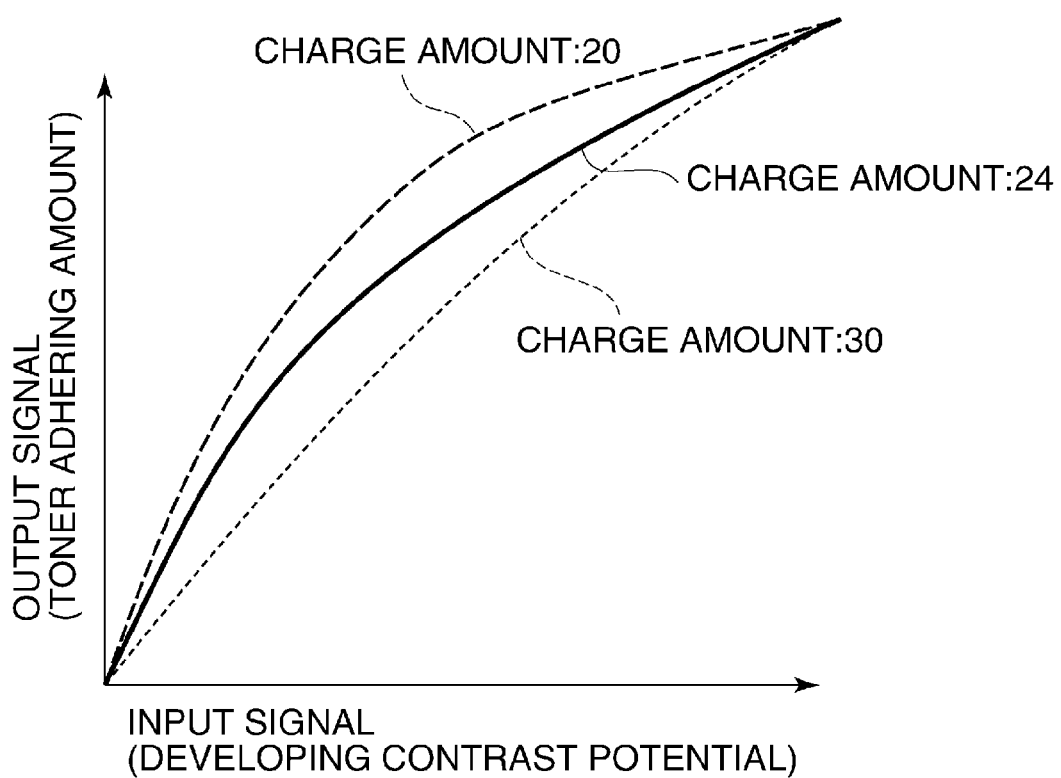
FIG. 7 illustrates a relationship between a developing contrast potential and an adhering toner amount.

The second calibration (second correction) in steps S115 to 5118 in FIG. 3 is calibration performed based on a toner condition. An amount of toner to be flown to the photosensitive member is determined according to an amount of electric charge on the toner and electric field intensity applied to the toner. Assuming that the distance between the developing device and the photosensitive member is fixed, the electric field intensity is determined based on the magnitude of a developing contrast Vcont as the difference between a DC component applied to the developing device and a potential VL at an exposed portion of the charged photosensitive member. FIG. 7 shows a LUT (Look-Up Table) formed by plotting the adhering toner amount on the vertical axis with respect to the developing contrast potential on the horizontal axis for each amount of charge to be held by the toner, in which values of the adhering toner amount are associated with values of the developing contrast potential are associated, respectively.

Referring to FIG. 3, the second calibration is started (step S115), and the adhering toner amount on the photosensitive member is measured in a state where the Vcont is known, whereby the amount of charge held by the toner is estimated (step S116).

In the image forming apparatus, there is stored a LUTb2 charge amount map defined based on the LUT in FIG. 7. The output gamma correction unit 1094 selects a gradation correction table LUTb2 according to the charge amount (step S117) from this map.

Next, the output gamma correction unit 1094 calculates a difference between the correction coefficient of the gradation correction table LUTb2 and 1 for each input density signal. Then, the output gamma correction unit 1094 calculates i.e. defines a correction coefficient adjustment table LUTb2' in which an adjustment correction coefficient obtained by multiplying the above difference by an associated value of a correction ratio coefficient, referred to hereinafter, is associated with each value of the input density signal (step S118).

Note that the LUT illustrated FIG. 7 is stored in advance in the memory as discrete data for each charge amount. The output gamma correction unit 1094 selects the LUT to be referred to from the discrete data based on the current charge amount. More specifically, when the charge amount is 24, the LUT for the charge amounts of 20 which is closest to 24 is referred to. Alternatively, a table for the charge amounts of 24 may be determined from the tables for the charge amounts of 20 and 30 by linear interpolation.

Note that although it is easy to determine the Vcont in a system including a potential sensor for measuring a potential on the photosensitive member, in a system without a potential sensor, the charge amount may be estimated based e.g. on an idling time of the developing device, temperature and humidity during operation of the developing device. Further, the gradation correction table LUTb2 is not limitatively calculated based on the charge amount, but it may be calculated based on any of the toner conditions including a toner replenishment amount, a toner consumption amount, a toner density, and so on.

Next, a description will be given of a method of combining the output correction table LUTb1 and the gradation correction table LUTb2 with reference to FIGS. 8A to 8C.

Since density is directly measured, the output correction table LUTb1 is highly reliable as a conversion table, but suffers from a problem of a valid range of detection by each of the density detection sensors 160a to 160d that an output difference is hardly detected in a high density range, which lowers the reliability thereof. On the other hand, although the gradation correction table LUTb2 is highly reliable on a solid image, in an area such as a halftone screen, where density is adjusted by area gradation, its reliability lowers depending on reproduction performance of dots (e.g. flown conditions). Therefore, it is preferable that correction is performed in a low density range of the toner image using the output correction table LUTb1, and in a high density range of the toner image using the gradation correction table LUTb2.

Figure 8A:
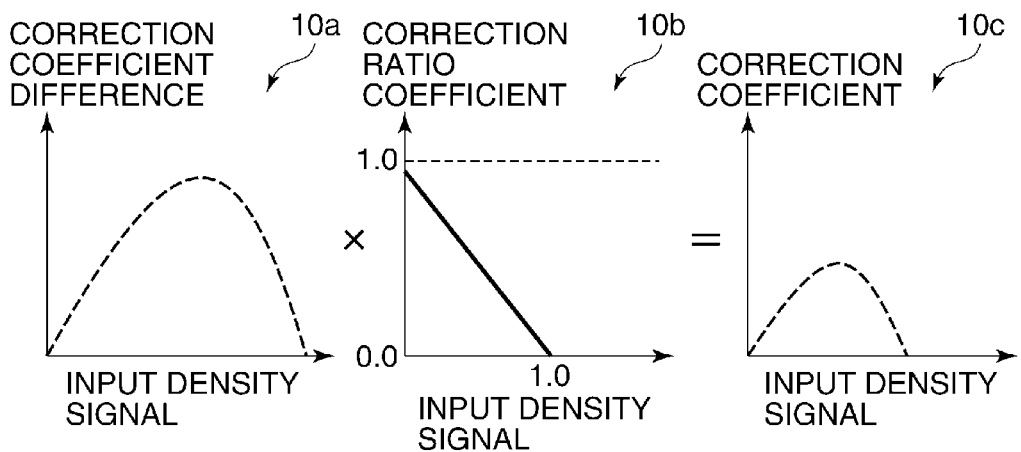
FIGS. 8A to 8C are conceptual diagrams of a method of forming a look-up table (LUT) by the image forming apparatus according to the first embodiment.

In FIG. 8A, first, the output gamma correction unit 1094 calculates a difference between the correction coefficient of output correction table LUTb1 and 1 for each input density signal (10a in FIG. 8A). Then, the output gamma correction unit 1094 multiplies the difference by the aforementioned correction ratio coefficient (10b in FIG. 8A) for each input density signal to thereby calculate the correction coefficient adjustment table LUTb1' (10c in FIG. 8A). The correction ratio coefficient is read from a correction ratio coefficient which is obtained, from characteristics of an optical sensor luminance-to-on-sheet density table of the density detection sensors 160a to 160d, by a linear (straight) line connecting a point of a correction ratio of 0 corresponding to an on-sheet density of 1.0 indicative of a saturation point, and a point of a correction ratio of 1 corresponding to an on-sheet density of 0 indicative of no developing agent on the sheet.

Figure 8B:
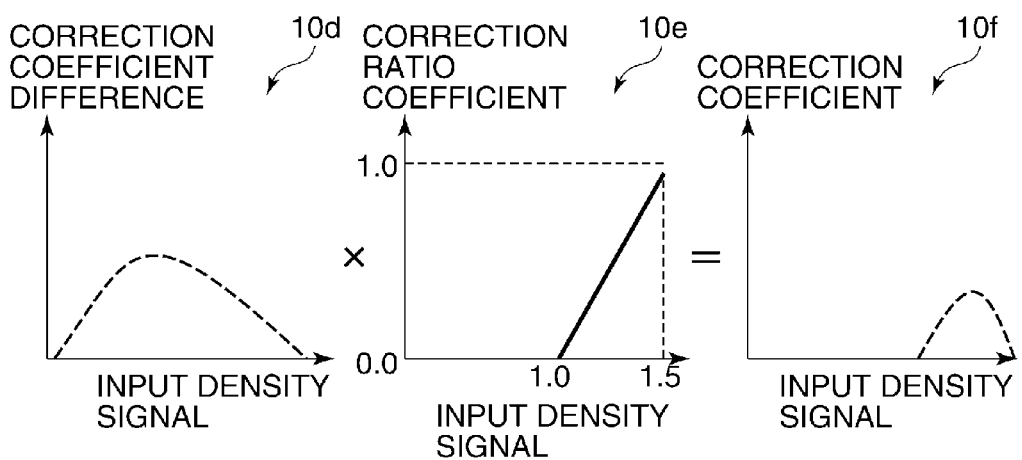

In FIG. 8B, the output gamma correction unit 1094 calculates a difference between the correction coefficient of the gradation correction table LUTb2 and 1 for each input density signal (10d in FIG. 8B). Then, the output gamma correction unit 1094 multiplies the difference by the aforementioned correction ratio coefficient (10e in FIG. 8B) for each input density signal to thereby calculate the correction coefficient adjustment table LUTb2' (10f in FIG. 8B). The correction ratio coefficient is read from a correction ratio coefficient which is obtained, from characteristics of the optical sensor luminance-to-on-sheet density table of the density detection sensors 160a to 160d, by a linear (straight) line connecting a point of a correction ratio of 0 corresponding to an on-sheet density of 1.0 indicative of the saturation point, and a point of a correction ratio of 1 corresponding to an on-sheet density of 1.5 indicative of the maximum amount of developing agent on the sheet, which is a solid density. Note that the correction ratio coefficient tables represent respective feedback ratios of the first and second calibrations responsive to each input signal.

Figure 8C:
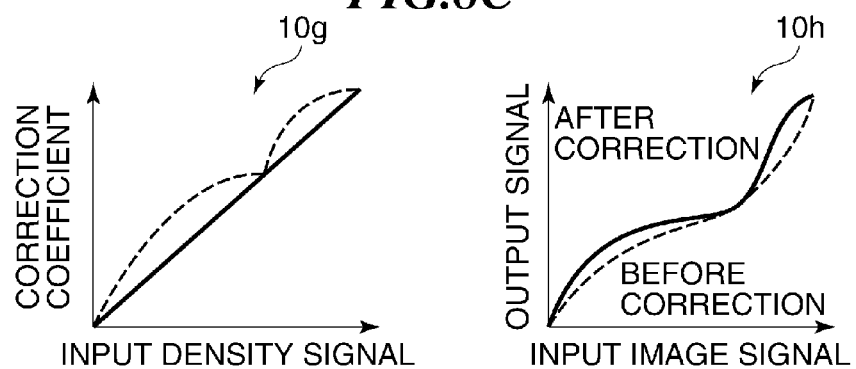

Referring again to FIG. 3, as shown in 10g in FIG. 8C, the output gamma correction unit 1094 calculates the LUTc by an expression of LUT linear +LUTb1'+LUTb2' for each input density signal (step S119). In this expression, "LUT linear" represents coefficients which correspond to the input density signal without correction. Further, "LUTb1'" and "LUTb2'" represent correction coefficients of the correction coefficient adjustment tables LUTb1' and LUTb2' which are associated with each value of the input density signal.

Hereafter, when the image forming apparatus performs image creation, gradation is determined by passing input density signal, having passed through the LUTa, further through the LUTc, for printout. As a result, the gradation correction as shown in 10*h* in FIG. 8C is performed by the LUTa and LUTc.

According to the present embodiment, a predetermined gradation pattern is formed on the image bearing member by the image forming section, the toner density is measured from the gradation pattern by each of the density detection sensors 160*a* to 160*d*, and the output correction table LUTb1 for correcting gradation of the image data is calculated based on the measured toner density (first calibration). Then, the gradation correction table LUTb2 for correcting the gradation of image data is calculated based on a condition of toner with which the image forming section forms a toner image on the image bearing member (second calibration). Then, a low density range of a toner image to be formed is corrected based on the output correction table LUTb1, and a high density range of the same is corrected based on the gradation correction table LUTb2. This makes it possible to correct gradation in ranges of density which cannot be detected by the density detection unit.

Further, the toner condition is estimated based on any of the charge amount of toner, idling time of the developing device, temperature and humidity of the developing device during operation. This makes it possible to improve accuracy in gradation correction in the range of density which cannot be detected by the density detection unit.

In a system that calculates the correction coefficient adjustment table LUTb2' without measuring the charge amount, the correction coefficient adjustment table LUTb2' may be updated without being limited to the timing of the first calibration, whereby the LUTc may be updated e.g. whenever one sheet is printed out.

Further, in the present embodiment, the description has been given of the system including the density detection sensors opposed to the respective photosensitive members in the system that directly sequentially transfers the respective colors from the photosensitive members onto the recording material. This is not limitative, but the preset embodiment may be applied to a system including an intermediate transfer member which collectively transfers an image formed by superposing colors transferred from the photosensitive members, onto a recording material, and a density detection sensor opposed to the intermediate transfer member.

Next, a description will be given of an image forming apparatus according to a second embodiment of the present invention. The present embodiment differs from the first embodiment in a method of correcting gradation such that no boundary of correction is formed in an intermediate portion of the gradation without excessive correction, and the method will be described with reference to FIGS. 9A to 9C. Note that components and operations of the second embodiment, not specified in the following description, are the same as those of the above-described embodiment.

Figure 9A:
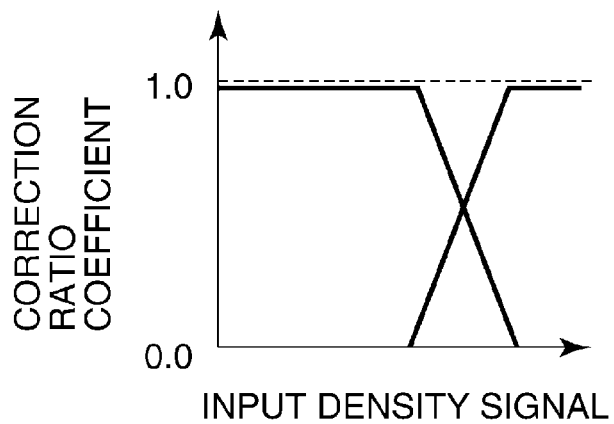
FIGS. 9A to 9C are conceptual diagrams of a method of forming a LOOK-UP TABLE (LUT) by an image forming apparatus according to a second embodiment of the invention.
Figure 9B:
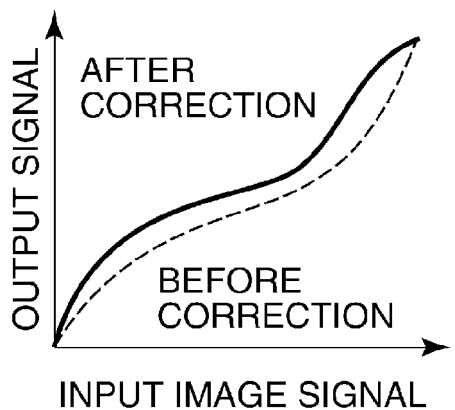
Figure 9C:
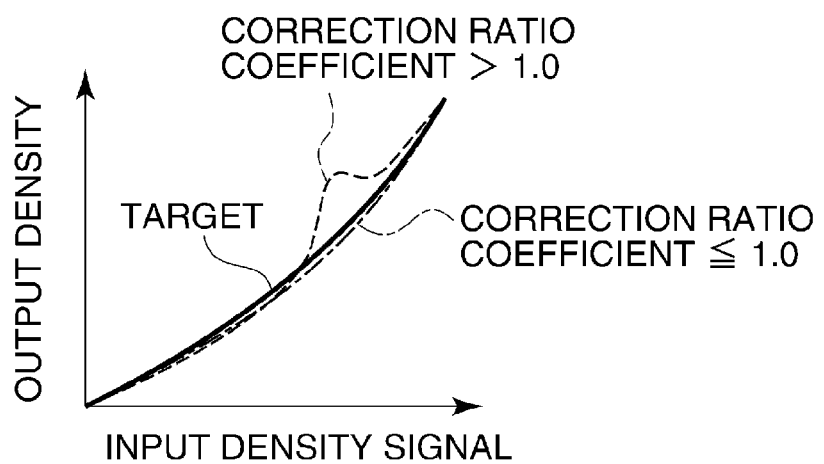

As shown in FIG. 9A, the correction ratio coefficient for the first calibration and that for the second calibration intersect with respect to the input signal, and they are configured such that each of them is not smaller than 0 and not larger than 1, and the sum of them is not larger than 1. As a result, compared with 10*h* in FIG. 8C in the first embodiment, a LUTc calculated as shown in FIG. 9B is corrected in a manner not depending on the input image signal. If the sum of the correction ratio coefficients becomes larger than 1.0, this causes excessive correction, and depending on the case, as shown in FIG. 9C, gradation inversion can be caused.

According to the present invention, it is possible to seamlessly execute the gradation correction both in the low density range and the high density range, and prevent excessive correction.

Next, a description will be given of an image forming apparatus according to a third embodiment of the present invention. The present invention differs from the above-described first and second embodiments in a method of making most of a valid range of detection by each density detection sensor, and the method will be described. Note that components and operations of the third embodiment, not specified in the following description, are the same as those of the above-described embodiments.

The image forming apparatus according to the third embodiment has a third calibration function within the output gamma correction unit 1094, for controlling the LUTa 1094*a*.

A description will be given of a gradation correction method and a role of the output gamma correction unit 1094.

Figure 11A:
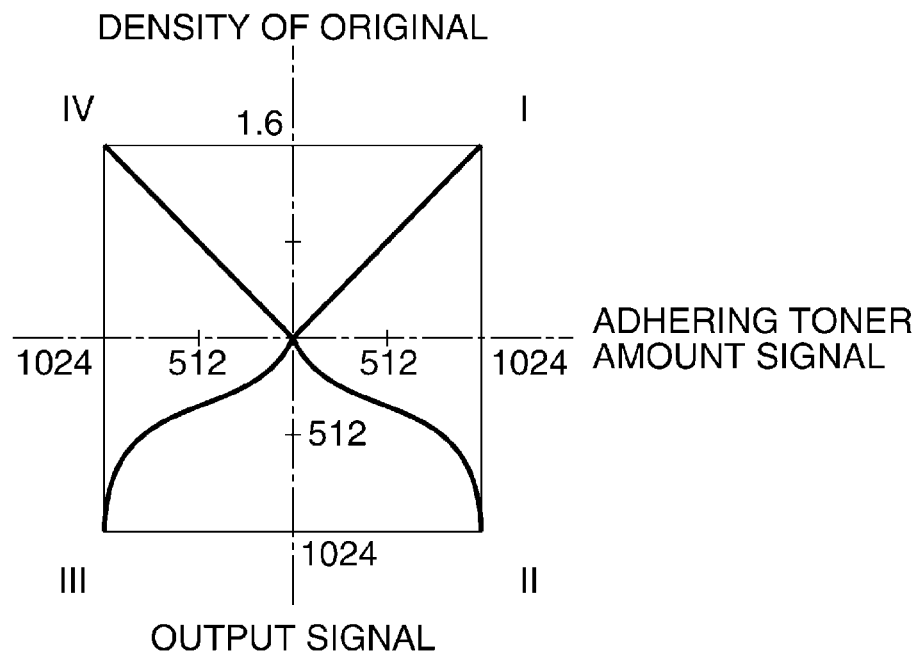
FIG. 11A is a diagram showing an example of characteristic conversion in gradation correction.

FIG. 11A is a characteristic conversion chart showing characteristics enabling reproduction of the density of an original image.

Region I shows characteristics of the reader unit A for converting the image density of an original to an adhering toner amount signal. Region II shows characteristics of the output gamma correction unit 1094 (LUTa) for converting the adhering toner amount signal to a laser output signal. Region III shows characteristics of the printer unit B for converting the laser output signal to an output adhering toner amount. Region IV shows the relationship between the density of an original and a recording adhering toner amount, and the characteristics of the relationship represent overall gradation characteristics of the copying machine according to the present embodiment.

In the present image forming apparatus, in order to make the gradation characteristics in Region IV linear, a non-linear portion of the recording characteristic of the printer unit B in Region III is corrected by the characteristics of the output gamma correction unit 1094 in Region II. The LUTa can be easily generated by inverting the input-output relationship in the characteristics in Region III obtained when the output is produced without operating the output gamma correction unit 1094. Note that in the present embodiment, the number of output gradations is 256 which corresponds to an image signal bit number of 8, however, internal processing is performed using a 10-bit digital signal, and hence the number of gradations is equal to 1024.

Figure 10:
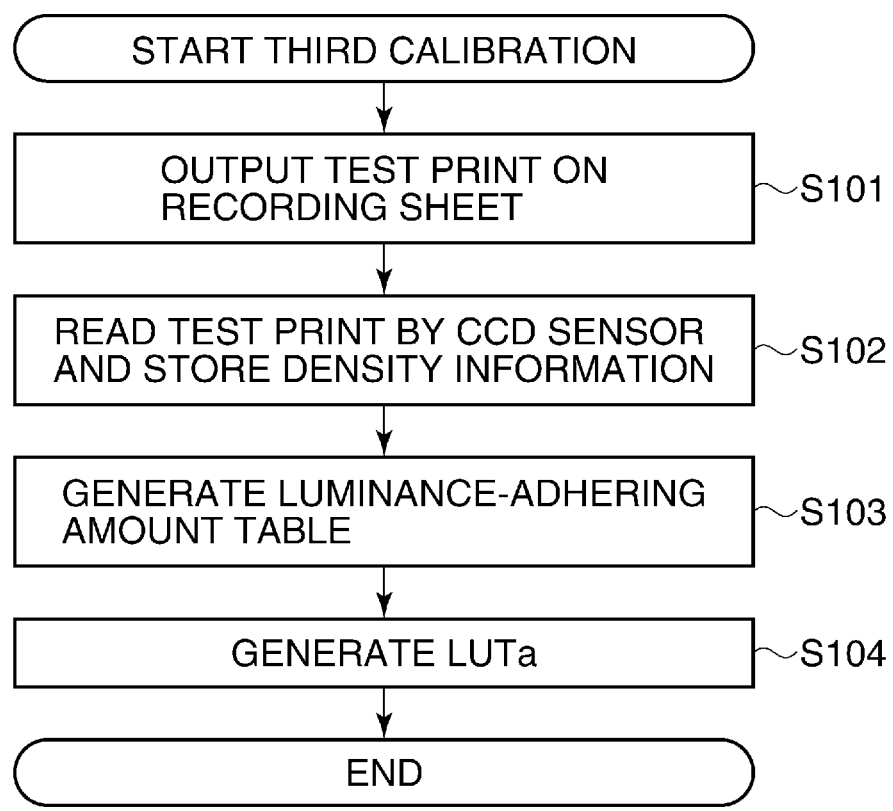
FIG. 10 is a flowchart of a third calibration process executed by an image forming apparatus according to a third embodiment of the invention.

FIG. 10 is a flowchart of a third calibration process executed by the image forming apparatus according to the third embodiment.

Figure 11B:
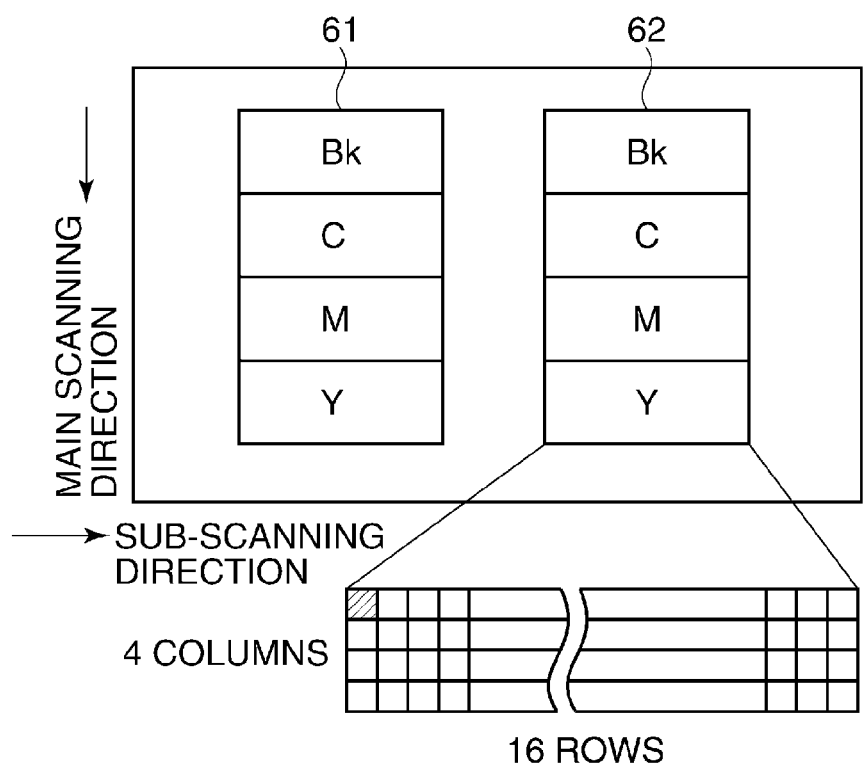
FIG. 11B is a diagram showing an example of an image pattern in gradation correction.

In FIG. 10, the image forming apparatus outputs a test print (step S101). Note that in the output of the test print, image formation is performed without operating the output gamma correction unit 1094. As shown in FIG. 11B, the test print comprises gradation patch groups formed by patches for the colors Y, M, C, and Bk, each color patch comprising 4 (columns)×16 (rows), i.e. a total of 64 gradations.

To the 64 gradations, there are mainly assigned gradations in a low-density range of the 256 gradations. By doing this, it is possible to favorably adjust gradation characteristics in highlighted portions.

In FIG. 11B, reference numeral 61 denotes a gradation patch group having a resolution of approximately 160 to 180 lpi (lines/inch), while reference numeral 62 denotes a gradation patch group having a resolution of approximately 250 to 300 lpi. Formation of images of the respective resolutions can be achieved by performing dither processing on the image signal based on parameters for realizing the resolutions in the printer controller 109 and outputting the resulting signal after subjecting to as PWM. Note that the present image forming apparatus forms gradation images at a resolution of approximately 160 to 180 lpi, and line images, such as characters, at a resolution of approximately 250 to 300 lpi. In the present embodiment, gradation patterns are output at the two resolutions for the same gradation levels. However, when a difference in resolution causes a significant difference in gradation characteristics, it is more preferable to configure the gradation levels according to the resolution.

Referring again to FIG. 10, the density information acquired by reading using the CCD sensor 105 is stored in the memory such that an adhering toner amount indicative of a gradation level is associated with a position where the gradation pattern is formed (step S102). In this stage, it is possible to determine the printer characteristics shown in Region III in FIG. 11A, and hence a luminance-adhering amount table representative of the printer characteristics is generated in which the luminance indicated by an output signal is associated with the toner adhering amount (step S103). Then, by inverting the input-output relationship of the printer characteristics, a gradation correction look-up table (LUTa) of this printer unit B is generated (step S104). In generating the LUTa by computation, since there are only a number of data items corresponding to the number of gradations, missing data items are calculated by interpolation. The above-described control process makes it possible to obtain a linear gradation characteristic with respect to the target adhering toner amount.

Hereafter, a description will be given of the actual operation and the configuration of the above-described calibration operation.

The above-described calibration can be executed as desired by the user. FIG. 12 illustrates a display of a console panel.

As shown in FIG. 12, an "auto calibration" button is displayed on a display screen of the console panel, and when the user presses the button, the above-described third calibration process is automatically executed. According to the present embodiment, by automatically executing the third calibration, it is possible to effectively correct short-term or long-term and other various variations in image density, image reproducibility, and gradation reproducibility, to thereby output optimal images. This calibration makes it possible to accurately adjust the monochromatic output characteristics of the printer section B to desired conditions, and hence it is possible to improve color reproducibility in a case where color management is performed using the printer controller 109 or an external ICC profile.

Next, a description will be given of a method of measuring toner density in a valid range of detection by each of the density detection sensors 160a to 160d with reference to FIGS. 13A to 13C.

Also in the CCD sensor 105, similarly to the density detection sensors 160a to 160d, by passing luminance signals through the conversion table (LUTid_r) 1098 in which the horizontal axis indicates a luminance, and the vertical axis indicates an on-sheet density (density on the sheet), it is possible to calculate the on-sheet density. That is, by placing a sheet on which an image is formed on the original platen glass 102 and causing the CCD sensor 105 to read the image, it is possible to measure the toner density on the sheet.

First, during execution of the above-described third calibration, a difference between density read by the CCD sensor 105 and that detected by each of the density detection sensors 160a to 160d is calculated. In general, the CCD sensor has characteristics that can accurately read density up to the high density range, compared with the density detection sensor.

Figure 13A:
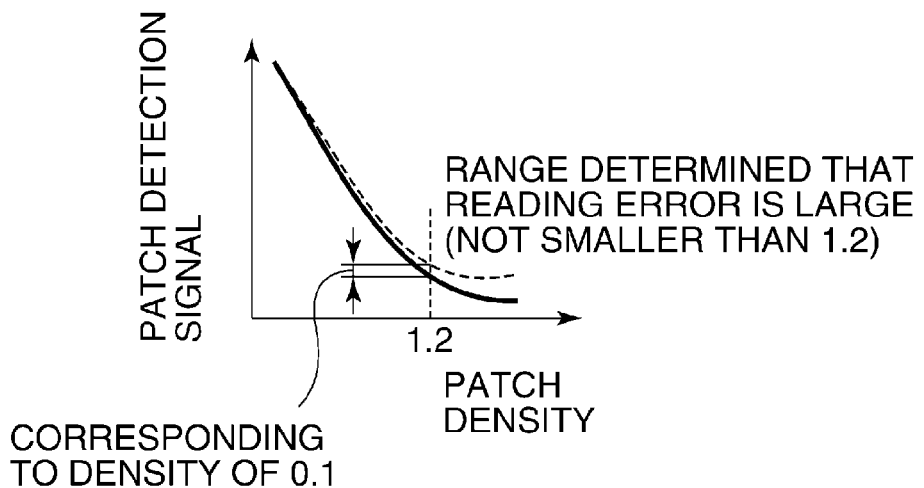
FIGS. 13A to 13C are conceptual diagrams useful in explaining a method of forming a LOOK-UP TABLE (LUT) by the image forming apparatus according to the third embodiment.
Figure 13B:
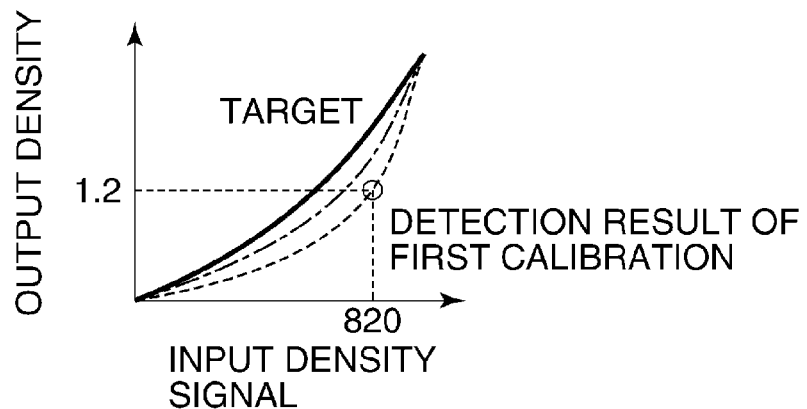
Figure 13C:
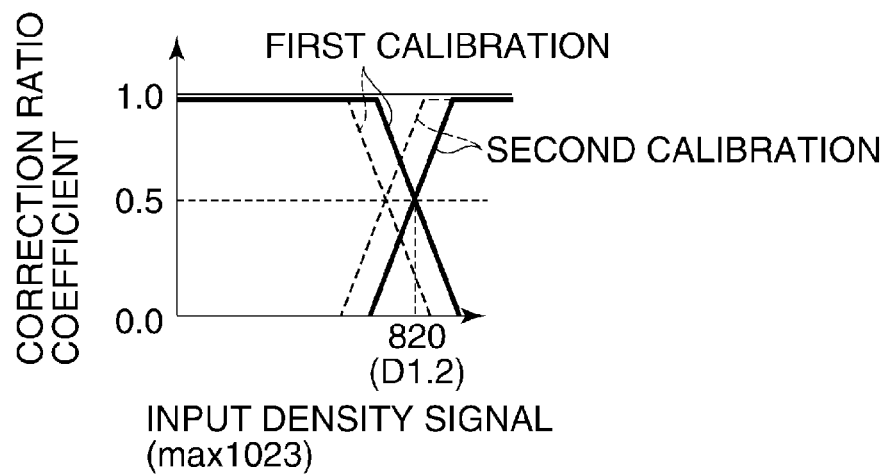

In a graph shown in FIG. 13A, the horizontal axis represents density determined via the CCD sensor 105, and the vertical axis represents a signal value from a patch detection sensor. A solid line on the graph represents characteristics of the patch detection, configured in advance, whereas a broken line plots a measurement result. A patch density at which the difference in signal value (on the vertical axis) of the patch detection between the solid line and the broken line becomes equal to a value equivalent to a density of 0.1 is determined from the lower side to the higher side of the density determined via the CCD sensor 105 (on the horizontal axis). In the illustrated example, the measurement result shows that the difference in signal value (on the vertical axis) of the patch detection, which is indicative of deviation from the characteristics of the patch detection configured in advance, becomes equal to the value equivalent to a density of 0.1 in a position at which the patch density (on the horizontal axis) is equal to 1.2. Based on the result of execution of the first calibration, a value of the input density signal which corresponds to an output density of 1.2 is derived (see FIG. 13B). In the present embodiment, the value of the input density signal is determined to be 820 (the maximum input density signal value is 1023). Then, the correction ratio coefficient is corrected such that the intersection point of the first calibration and the second calibration becomes 820 (see FIG. 13C). In the example of FIG. 13C, lines extending from the left side represent the first calibration, and lines on the right side represent the second calibration. Further, broken ones of the lines represent the first and second calibrations according to the first embodiment, and solid ones of the lines represent the first and second calibrations in which the intersection point thereof is moved to the position of to a input density signal value of 820 which corresponds to an output density of 1.2.

Hereafter, similarly to the first embodiment, the LUTc is recalculated. This makes it possible to perform correction using a correction coefficient value based on the output from each density detection sensor with respect to a range of density in which direct measurement of density by the density detection unit is possible, and perform correction by the second calibration with respect to a range of density in which direct measurement of density by the density detection unit is impossible.

By modifying the correction ratio conversion table according to the result of the first calibration, it is possible to perform gradation correction by making most of a range of density in which measurement by the density detection unit is possible, and further without using a range of density in which measurement by the density detection unit is impossible.

Next, a description will be given of an image forming apparatus according to a fourth embodiment of the present invention. The present embodiment differs from the above-described first to third embodiments in a method of optimizing the correction ratio coefficient for each halftone screen, and hence the method will be described. Note that components and operations of the fourth embodiment, not specified in the following description, are the same as those of the above-described embodiment.

The image forming apparatus according to the fourth embodiment includes a high resolution screen having approximately 260 lines per inch, which is applied to character part and the like, and a low resolution screen having approximately 150 lines per inch, which is applied to picture part and the like.

Figure 14A:
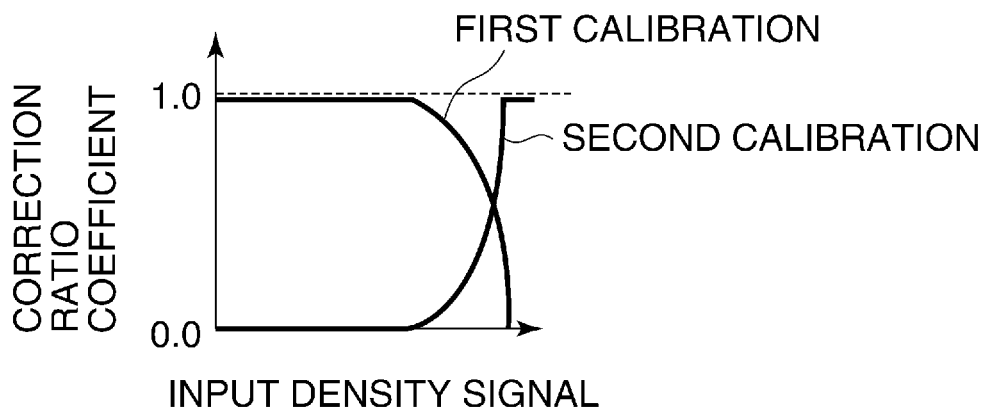
FIGS. 14A and 14B are diagrams showing respective examples of correction ratio coefficient tables associated with a low line number screen and a high line number screen, which are used in an image forming apparatus according to a fourth embodiment of the invention.

In the low resolution screen, a latent image is formed in an uneven state. Although it is possible to calculate an average charge amount of toner in the second calibration, it is impossible to estimate distribution of the charge amount of toner which slightly differs from toner to toner. When the latent image is uneven, the gradation characteristics tend to change depending on the distribution of the charge amount. Therefore, as shown in FIG. 14A, the correction ratio coefficient is set such that a contribution ratio of the first calibration is increased.

Figure 14B:
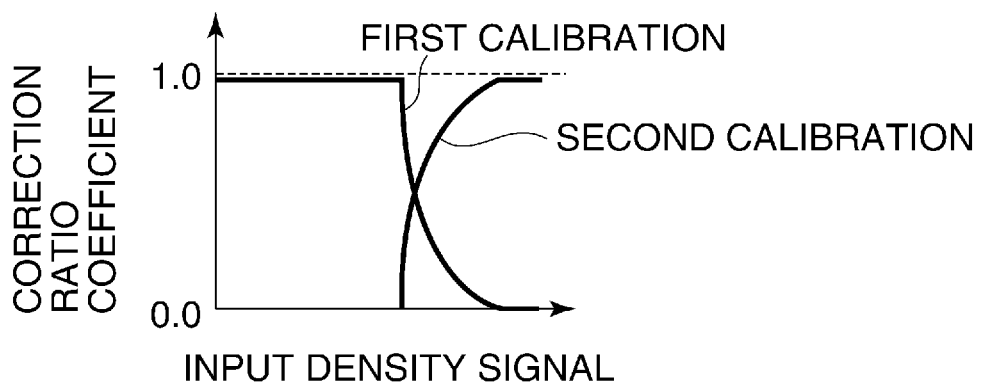

In the high resolution screen, a latent image is formed in a relatively flat state, and density in halftone has a high correlation with the averaged value, not depending on the distribution of the charge amount of toner. Therefore, as shown in FIG. 14B, the correction ratio coefficient is set such that a contribution ratio of the second calibration is increased. By doing this, the LUTc suitable for each of halftone screens of a plurality of types is calculated.

According to the present embodiment, by changing the correction ratio coefficient table according to the type of a halftone screen to be used, it is possible to make most of the range of density in which measurement by the density detection unit is possible, on each halftone screen.

Next, a description will be given of an image forming apparatus according to a fifth embodiment of the present invention. The present embodiment will be specifically described with reference to FIGS. 15A and 15B.

A description will be given of a method of optimizing the correction ratio coefficient according to conditions of the image forming apparatus. Note that components and operations of the fifth embodiment, not specified in the following description, are the same as those of the above-described embodiment.

Figure 15A:
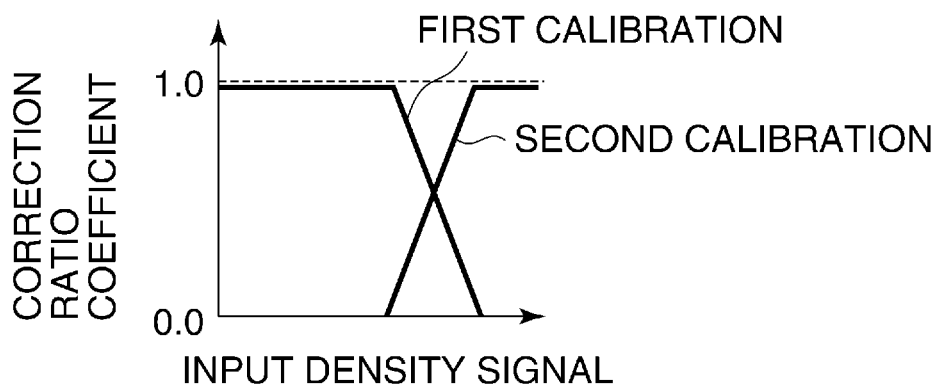
FIGS. 15A and 15B are diagrams showing respective examples of correction ratio coefficient tables associated with different use conditions, which are used in an image forming apparatus according to a fifth embodiment of the invention.

The correction ratio coefficient is, as shown in FIG. 15A, set such that the first calibration and the second calibration are blended at the same ratio, just like that shown in FIG. 9A of the second embodiment.

Although in the second calibration, the control is performed by predicting the charge amount of developer, as described above, depending on different use conditions, such as deterioration of the developer due to long-term use of the image forming apparatus, and long-term leaving of the image forming apparatus in a high-humidity environment, sometimes makes gradation characteristics liable to deviate from the gradation correction table LUTb2 determined based on the charge amount. In the present embodiment, detection of such conditions is performed by combining a counter, not shown, of the developing device 123, as a component of the printer controller 109, a temperature and humidity sensor, not shown, and a timer, not shown, included in the printer unit B. For example, let it be assumed that the counter counts over one hundred thousand of sheets of A4 size, which is a set lifespan, and the temperature and humidity are as high as 32° C. and 85%, respectively. These are conditions for causing prediction that the gradation characteristics deviate from the gradation correction table LUTb2 estimated from the charge amount.

Figure 15B:
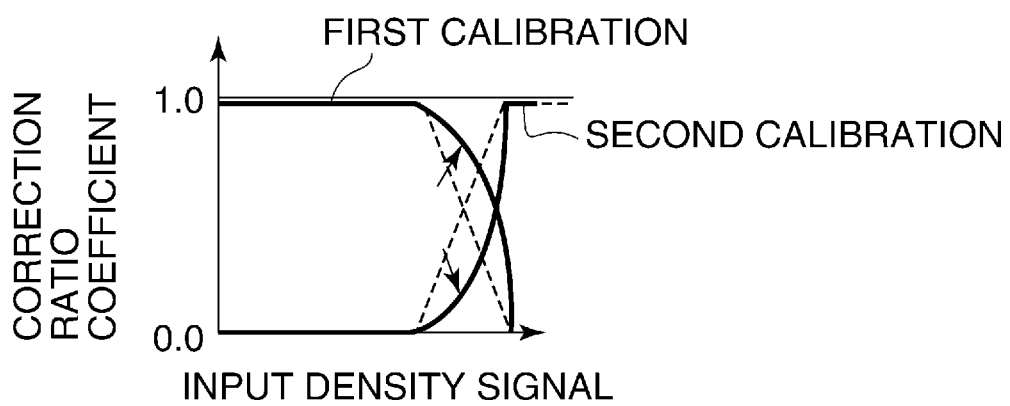
Figure 16A:
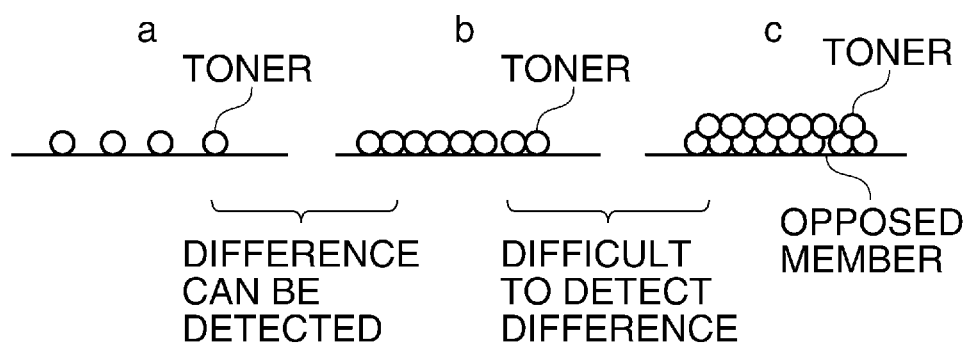
FIG. 16A is a diagram showing examples of how toner is adhered.
Figure 16B:
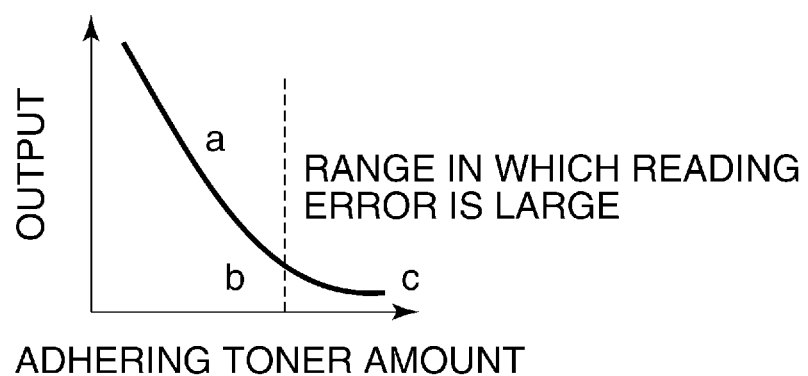
FIG. 16B is a diagram showing a relationship between an output from a density detection sensor and an adhering toner amount.

Next, as shown in FIG. 15B, the correction ratio coefficient is set such that the contribution ratio of the first calibration is increased, and that of the second calibration is reduced. Although accuracy is lower than that in the normal usage environment, this makes it possible to prevent erroneous correction.

According to the present embodiment, the correction ratio coefficient table is modified according to aging of toner, environment, and aging of the photosensitive member. This makes it possible to make most of the range of density in which measurement by the density detection unit is possible, according to aging of toner, environment, and aging of the photosensitive member.

Although in the present embodiment, the description has been given of the case where the conditions are switched over, the contribution ratio may be gradually changed according to the count of a certain counter, temperature and humidity, and any other suitable parameters. Further, in a system in which development performance is affected by the durability of the photosensitive member, the contribution ratio may be changed according to the durability of the photosensitive member. In addition, because the correction ratio coefficient in the present fifth embodiment is initially set, as shown in FIG. 15A, in the same manner as the second embodiment, as shown in FIG. 9A, it can be seen that the fifth embodiment can be considered an addition to the second embodiment.

Although in the embodiments of the present invention, the description has been given of the electrophotographic color copying machine including the plurality of photosensitive drums, by way of example, this is not limitative, but it is to be understood that the present invention can also be applied to an electrophotographic copying machine or a printer of various types, and a monochrome image forming apparatus.

Further, the arrangement of the density detection sensors are not limited to the above-described arrangement, but a density detection sensor may be configured to measure toner density on the intermediate transfer member to which a toner image has been transferred from the photosensitive drum, or toner density on a recording material to which a toner image has been transferred from the photosensitive drum or the intermediate transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-131927, filed Jun. 9, 2010 which is hereby incorporated by reference herein in its entirety.

What is claimed is:

1. An image forming apparatus configured to form a toner image on an image bearing member according to image data, comprising:
    an image forming unit configured to form a gradation pattern on the image bearing member;
    a density detection unit configured to detect density of the gradation pattern formed by said image forming unit;
    a first calculation unit configured to calculate a first correction value for correcting gradation of the image data based on density of the gradation pattern, detected by said density detection unit;
    a second calculation unit configured to estimate a condition of toner with which said image forming unit forms a toner image on the image bearing member, and calculate a second correction value for correcting the gradation of the image data based on the estimated condition of toner; and
    a correction unit configured to correct density in a low density range of the toner image based on the first correction value, and correct density in a high density range of the toner image based on the second correction value.

2. The image forming apparatus according to claim 1, further comprising a developing device configured to form a toner image by developing an electrostatic latent image on the image bearing member, and
    wherein said second calculation unit is configured to estimate the condition of toner based on (a) a charge amount of toner, (b) an idling time of the developing device, (c)

temperature and humidity of the developing device during operation thereof, or some or all of (a), (b), and (c).

3. The image forming apparatus according to claim 1, wherein a sum of a correction ratio coefficient used in said first calculation unit and a correction ratio coefficient used in said second calculation unit is set to be not smaller than 0 and not larger than 1.

4. The image forming apparatus according to claim 1, wherein a correction ratio coefficient table generated based on a correction ratio coefficient used in said first calculation unit and a correction ratio coefficient used in said second calculation unit is changed according to the first correction value calculated by said first calculation unit.

5. The image forming apparatus according to claim 1, wherein a correction ratio coefficient table generated based on a correction ratio coefficient used in said first calculation unit and a correction ratio coefficient used in said second calculation unit is changed according to a type of a screen used.

6. The image forming apparatus according to claim 1, wherein the correction ratio coefficient table is changed according to aging of toner, an environment, and aging of a photosensitive member.

7. The image forming apparatus according to claim 1, wherein the condition of toner is a charge amount of toner.

8. The image forming apparatus according to claim 1, wherein the estimation of the condition of toner is different than the detection of the density of the gradation pattern.

* * * * *